United States Patent
Shiozaki

(10) Patent No.: US 11,245,852 B2
(45) Date of Patent: Feb. 8, 2022

(54) CAPTURING APPARATUS FOR GENERATING TWO TYPES OF IMAGES FOR DISPLAY FROM AN OBTAINED CAPTURED IMAGE BASED ON SCENE LUMINANCE AND EXPOSURE

(71) Applicant: CANON KABUSHIKI KAISHA, Tokyo (JP)

(72) Inventor: Tomoyuki Shiozaki, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/192,672

(22) Filed: Mar. 4, 2021

(65) Prior Publication Data
US 2021/0289143 A1 Sep. 16, 2021

(30) Foreign Application Priority Data

Mar. 13, 2020 (JP) .............................. JP2020-044385

(51) Int. Cl.
*H04N 5/232* (2006.01)
*H04N 5/238* (2006.01)
*H04N 5/235* (2006.01)

(52) U.S. Cl.
CPC ....... *H04N 5/232935* (2018.08); *H04N 5/238* (2013.01); *H04N 5/2351* (2013.01); *H04N 5/2353* (2013.01)

(58) Field of Classification Search
CPC ........... H04N 5/232935; H04N 5/2353; H04N 5/238; H04N 5/2351
See application file for complete search history.

(56) References Cited

U.S. PATENT DOCUMENTS

| 7,352,398 | B2* | 4/2008 | Sano ...................... H04N 5/235 348/222.1 |
| 10,104,294 | B2* | 10/2018 | Fukushima ...... H04N 5/232933 |
| 2007/0092154 | A1* | 4/2007 | Kato .................. H04N 5/23245 382/254 |
| 2017/0318208 | A1* | 11/2017 | Toyoda .................. H04N 5/235 |

FOREIGN PATENT DOCUMENTS

JP 2010-245924 A 10/2010

* cited by examiner

*Primary Examiner* — Luong T Nguyen
(74) *Attorney, Agent, or Firm* — Canon U.S.A., Inc. IP Division

(57) ABSTRACT

An apparatus obtains a captured image, obtains exposure setting relating to the captured image, obtains for luminance of a scene, sets a mode for generating the display image; and generates the display image by performing luminance conversion of the captured image depending on the set mode. The apparatus performs, in a case where a first mode is set, the luminance conversion of the captured image using a first conversion characteristic indicating that output luminance after conversion is determined for the luminance of the scene, and does not change depending on the exposure setting. And the apparatus performs, in a case where a second mode is set, the luminance conversion of the captured image using a second conversion characteristic indicating that the output luminance changes depending on the exposure setting.

19 Claims, 7 Drawing Sheets

FIG. 4A

| | | | |
|---|---|---|---|
| WHITE BALANCE | AWB | | |
| MWB IMAGE SELECTION | | | |
| WB CORRECTION / BKT SETTING | 0,0/±0 | | |
| PICTURE STYLE | | | STANDARD |
| DISPLAY MODE | | | OVF-LIKE |
| RECORDING IMAGE QUALITY | | | HDR |

FIG. 4B

DISPLAY MODE

OVF-LIKE

RECORDING IMAGE QUALITY

FIG. 4C

RECORDING IMAGE QUALITY

HDR

SDR

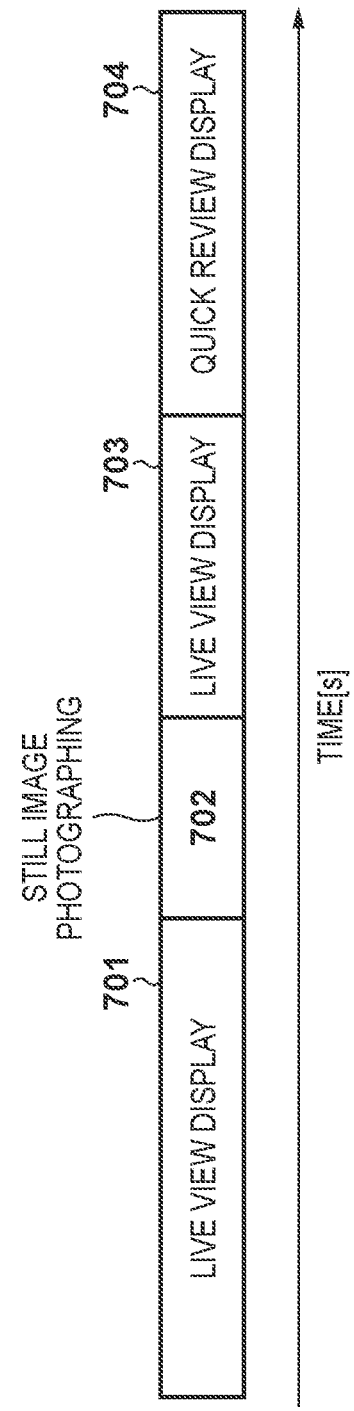

CAPTURING APPARATUS FOR GENERATING TWO TYPES OF IMAGES FOR DISPLAY FROM AN OBTAINED CAPTURED IMAGE BASED ON SCENE LUMINANCE AND EXPOSURE

BACKGROUND OF THE DISCLOSURE

Field of the Disclosure

The aspect of the embodiments relates to an apparatus, a capturing apparatus, a control method and a storage medium, particularly to a live view display technology during image capturing.

Description of the Related Art

Conventionally, for an analog single-lens reflex camera, an optical viewfinder (hereinafter, OVF) is provided. Since the light incident on an image capturing lens is refracted by the reflex mirror and the pentaprism and reaches the OVF, a user can confirm a subject image with an immersive feeling as if the user were looking at the camera finder by cutting out actual scenery.

On the other hand, in the image capturing apparatus such as a digital camera, a function of electronic viewfinder (hereinafter, EVF) is provided by sequentially displaying (live view display) images captured by an image sensor such as a CCD or a CMOS device at predetermined intervals on a display device such as a liquid crystal monitor. Since it is possible to present an image to which various image processing is applied as the EVF, the user can confirm the effect of imaging settings such as exposure, shutter speed, white balance, and the like by the EVF before photographing.

Japanese Patent Laid-Open No 2010-245924 describes an image display apparatus that presents a high-tone captured image in which overexposure and underexposure are reduced by performing tone correction in order to enhance the visibility of the image presented by EVFs.

Incidentally, in order to allow the user to easily grasp what kind of image is recorded, a live view image generally presented by EVF has a configuration simulating an image recorded by photographing. Here, since the memory colors (or impression colors) that people remember as pictures are often more vivid than the actual colors, the images recorded by the image capturing apparatus are processed to be vivid and have high contrast.

However, since the expressions of colors and brightness appearing in such an image are different from those appearing in actual scenery seen by a human eye, it is difficult for the user to obtain an immersive feeling as if the user were looking at a camera finder by cutting out the actual scenery, such as OVF, for example.

SUMMARY OF THE DISCLOSURE

The disclosure in its first aspect provides an apparatus for generating a display image to be displayed on a display device based on a captured image obtained by capturing a scene, comprising: at least one processor; and a memory storing a program that, when executed by the at least one processor, causes the at least one processor to function as: a first obtaining unit configured to obtain the captured image; a second obtaining unit configured to obtain exposure setting relating to the obtained captured image; a third obtaining unit configured to obtain luminance of the scene; a setting unit configured to set a mode for generating the display image; and a generation unit configured to generate the display image by performing luminance conversion of the obtained captured image depending on a mode set by the setting unit, wherein in a case where a first mode is set, the generation unit performs the luminance conversion of the captured image using a first conversion characteristic indicating that output luminance after conversion is determined for the luminance of the scene, and that the output luminance does not change depending on the exposure setting, and in a case where a second mode is set, the generation unit performs the luminance conversion of the captured image using a second conversion characteristic indicating that the output luminance changes depending on the exposure setting.

The disclosure in its second aspect provides a capturing apparatus comprises: the apparatus according to the first aspect; an image sensor outputs the captured image; at least one processor; and a memory storing a program that, when executed by the at least one processor, causes the at least one processor to function as a display control unit configured to control display of the display image on the display device.

The disclosure in its third aspect provides a method of an apparatus for generating a display image to be displayed on a display device based on a captured image obtained by capturing a scene, comprising: first obtaining the captured image; second obtaining exposure setting relating to the captured image obtained by the first obtaining; third obtaining luminance of the scene; setting a mode for generating the display image; and generating the display image by performing luminance conversion of the captured image by the first obtaining depending on a mode set by the setting, wherein in a case where a first mode is set, the luminance conversion of the captured image is performed using a first conversion characteristic indicating that output luminance after conversion is uniquely determined for the luminance of the scene, and that the output luminance does not change depending on the exposure setting, and in a case where a second mode is set, the luminance conversion of the captured image is performed using a second conversion characteristic indicating that the output luminance changes depending on the exposure setting.

The disclosure in its fourth aspect provides a control method of an image capturing apparatus having an image processing apparatus according to the first aspect and an image sensor outputs the captured image by capturing, comprising: a display control step for controlling display of the display image on the display device.

The disclosure in its fifth aspect provides a computer-readable storage medium storing a program for causing a computer to perform method of an apparatus for generating a display image to be displayed on a display device based on a captured image obtained by capturing a scene, the method comprising: first obtaining the captured image; second obtaining exposure setting relating to the captured image obtained by the first obtaining; third obtaining luminance of the scene; setting a mode for generating the display image; and generating the display image by performing luminance conversion of the captured image obtained by the first obtaining depending on a mode set by the setting, wherein in a case where a first mode is set, the luminance conversion of the captured image is performed using a first conversion characteristic indicating that output luminance after conversion is uniquely determined for the luminance of the scene, and that the output luminance does not change depending on the exposure setting, and in a case where a second mode is set, the luminance conversion of the captured image is performed using a second conversion characteristic indicating that the output luminance changes depending on the exposure setting.

Further features of the disclosure will become apparent from the following description of exemplary embodiments (with reference to the attached drawings).

BRIEF DESCRIPTION OF THE DRAWINGS

FIGS. 4A, 4B and 4C are diagrams exemplarily illustrating menu screens displayed on the digital camera 100 according to the embodiment of the disclosure;

FIG. 7 is a timing chart exemplarily illustrating the display on the display unit 28 according to the embodiment of the disclosure.

DESCRIPTION OF THE EMBODIMENTS

Figure 1A:
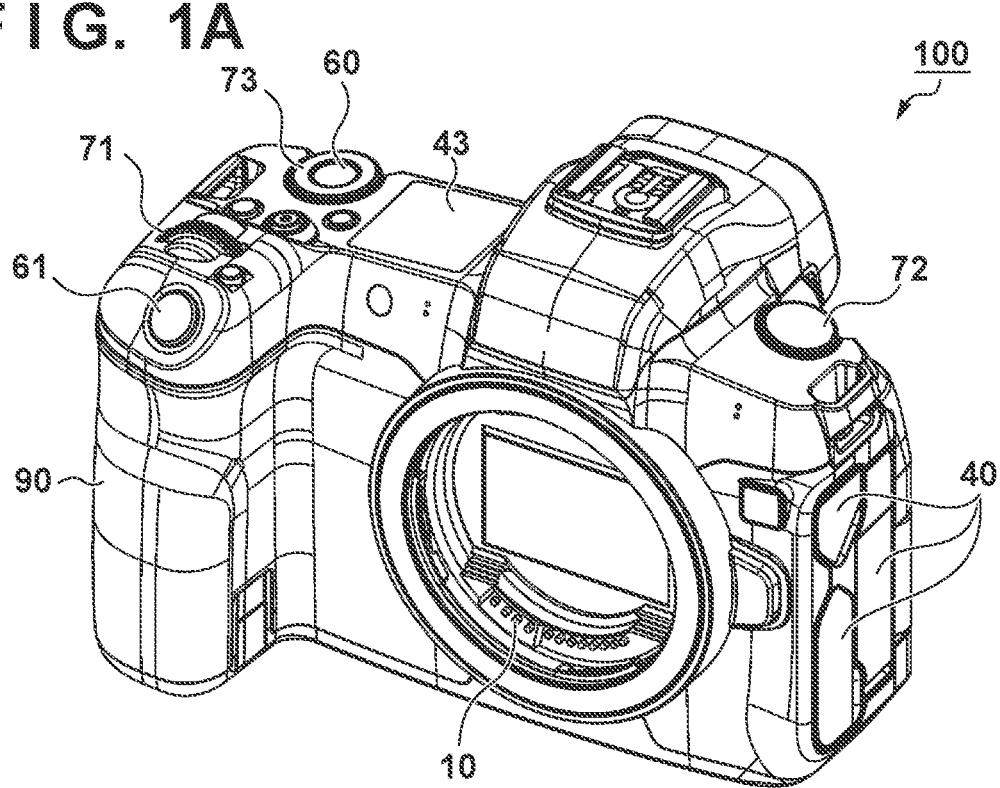
FIGS. 1A and 1B are diagrams exemplarily illustrating an external appearance of a digital camera 100 according to an embodiment of the disclosure.

Hereinafter, embodiments will be described in detail with reference to the attached drawings. Note, the following embodiments are not intended to limit the scope of the disclosure. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

Embodiments

In the embodiment described below, an example in which the disclosure is applied to a digital camera having an electronic viewfinder function as an example of an image processing apparatus. However, the disclosure can be applied to any device capable of generating an image for displaying by applying predetermined luminance conversion to a captured image obtained by image capturing.

<Configuration of the Digital Camera 100>

Figure 1B:
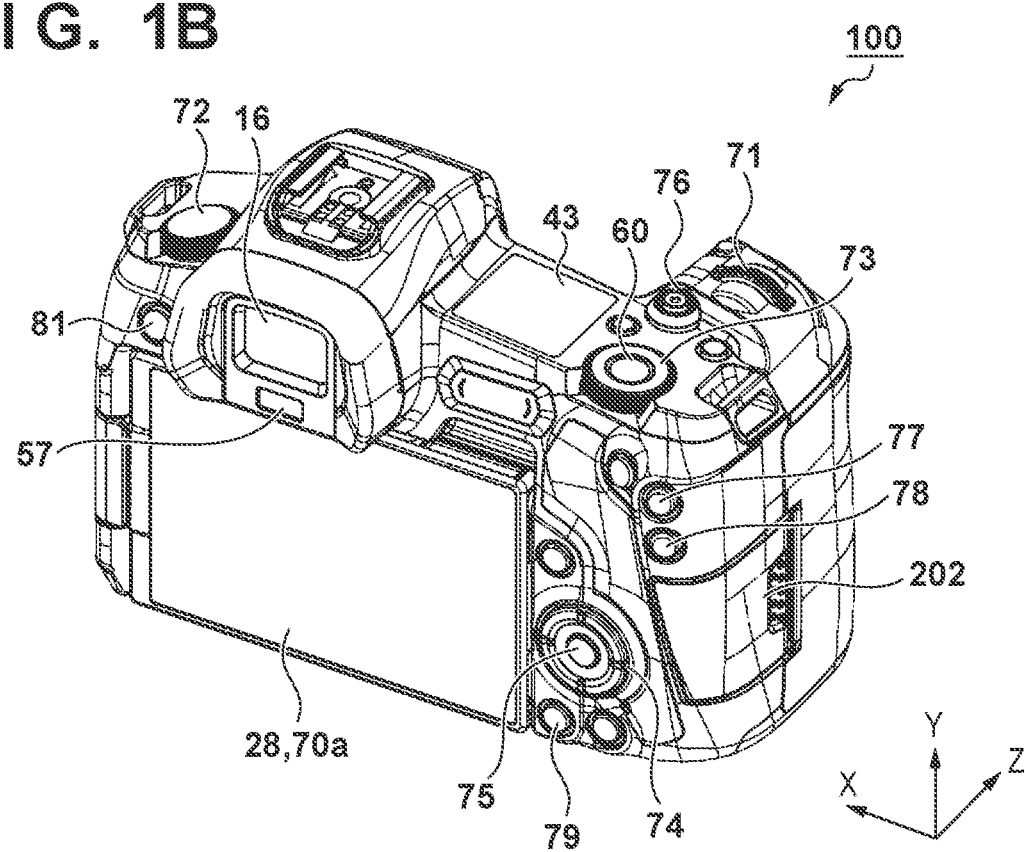

FIG. 1 is a diagram exemplarily illustrating an external appearance of a digital camera 100 according to an embodiment of the disclosure. FIG. 1A shows a front perspective view of the digital camera 100, and FIG. 1B shows a rear perspective view of the digital camera 100.

A display unit 28 is a display device provided on the back of the digital camera 100, and displays images and various information. A touch panel 70a detects a touch operation on the display surface (operation surface) of the display unit 28. A setting display unit 43 is a display device provided on upper surface of the digital camera, and displays various set values of the digital camera 100 including the shutter speed and aperture value.

A shutter button 61 is an operation member for accepting a photographing instruction. A mode switch 60 is an operation member for switching the various modes. A terminal cover 40 is a cover for protecting the connector (not shown) which connects the connection cable for an external device and the digital camera 100. A power switch 72 is an operation member for switching power supply ON/OFF on the digital camera 100. The sub-electronic dial 73 is an operation member configured to be rotatable, and when rotated, accepts movement of a selection frame and image feed instructions. A cross (four-way) key 74 is an operation member that is configured to accept push-in operation input separately for up, down, left, and right. A SET button 75 is an operation member that is configured to be able to accept push-in operation input, and accepts an instruction to decide a selection item or the like. A moving image button 76 is an operation member that is configured to be able to accept push-in operation input, and accepts an instruction to start or stop moving image capturing (recording). An AE lock button 77 is an operation member that is configured to be able to accept push-in operation input, and when pressed while the digital camera 100 is in the photographing standby state, accepts an instruction to fix the exposure state. An enlargement button 78 is an operation member that is configured to be able to accept push-in operation input, and accepts an instruction to switch ON/OFF of enlarged display for a live view display on a photographing mode.

The main electronic dial 71 is an operation member configured to be rotatable, and when rotated, accepts an instruction for changing set values such as a shutter speed or an aperture value. When the enlargement display is ON in the live view display, the rotation operation to the main electronic dial 71 is accepted as an instruction for enlarging/reducing the live view image. In a playback mode, the rotation operation to the main electronic dial 71 is accepted as an instruction for enlarging a playback image and an instruction for increasing an enlargement ratio. A playback button 79 is an operation member that is configured to be able to accept push-in operation input, and accepts instructions to switch ON/OFF between a photographing mode and the playback mode. In response to the operation input to the playback button 79 is made on the shooting mode, the digital camera 100 shifts to the playback mode, for example, a latest image among images recorded to the recording medium 200 is displayed on the display unit 28. A menu button 81 is an operation member that is configured to be able to accept push-in operation input, and accepts an instruction to display various settable menu screens on the display unit 28. When the menu screen is displayed, an instruction for changing various settings is accepted based on an operation input to the cross key 74 or the SET button 75.

A communication terminal 10 is an electrical contact for communicating with a lens unit 150 to be described later. The lens unit 150 is detachably configured with respect to the digital camera 100, it is not mounted in FIG. 1. An eyepiece 16 is a window related to an eyepiece finder (a viewfinder of a peep-in type), and a user can view images displayed on an inner EVF (Electric Viewfinder) 29 through the eyepiece 16. An eye-close detection unit 57 is a sensor that detects whether or not the eyepiece 16 is in an eye-close state. A lid 202 is a lid of a slot in which the recording medium 200 is stored. A grip 90 is a structure that makes it easy to grasp the digital camera 100. The digital camera 100 is configured such that the shutter button 61 and the main electronic dial 71 are disposed in a position operable by an index finger of a right hand while the user grasps the digital camera 100 while a pinky finger, a ring finger, and a middle finger of the right hand are attached to the grip 90. The sub-electronic dial 73 is also arranged at a position that can be operated by a thumb of the right hand.

<Functional Configuration of the Digital Camera 100>

Figure 2:
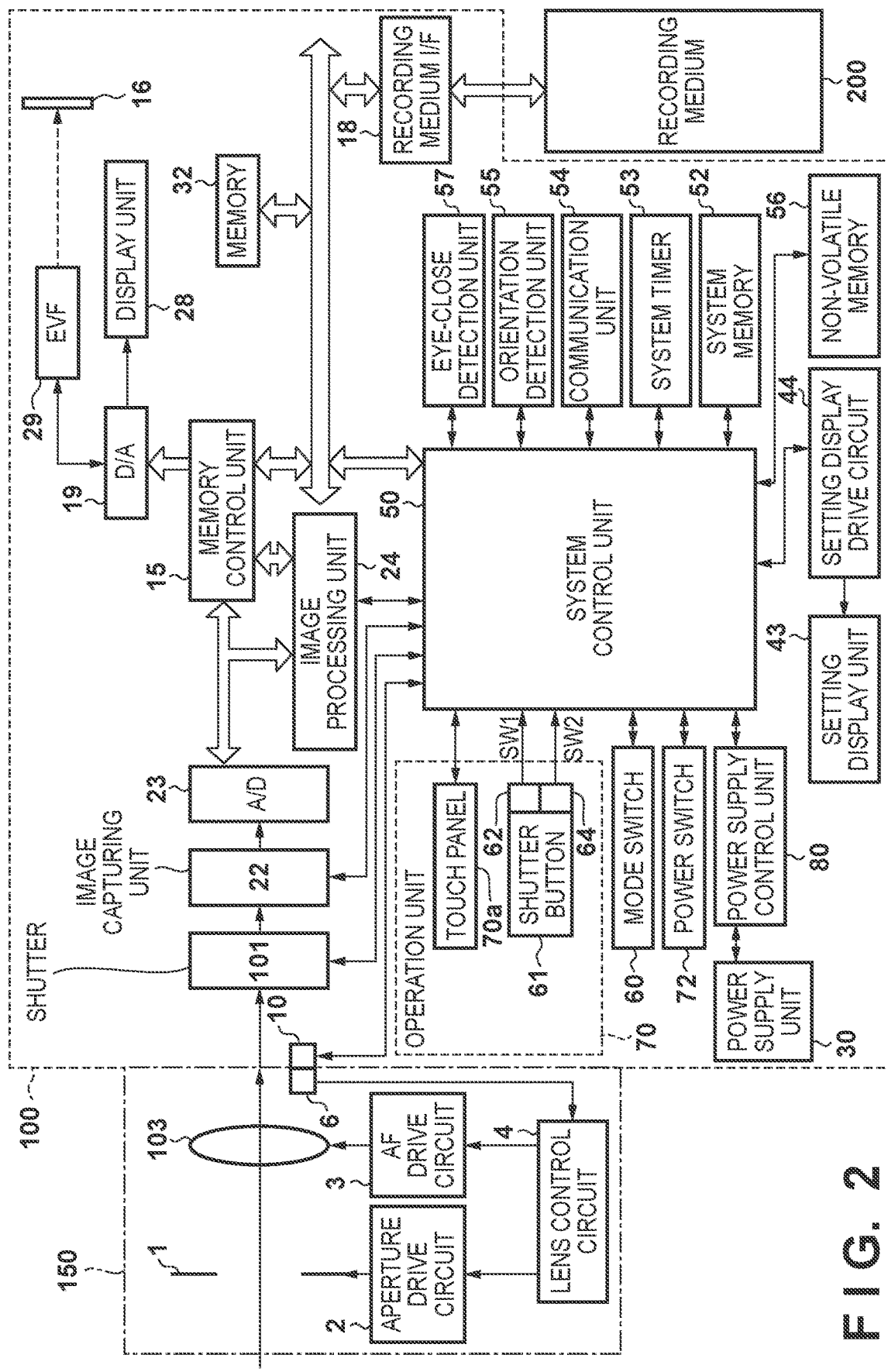
FIG. 2 is a block diagram exemplarily illustrating a functional configuration of the digital camera 100 according to the embodiment of the disclosure.

Subsequently, the functional configuration of the digital camera 100 will be described with reference to a block diagram of FIG. 2. In FIG. 2, the lens unit 150 is mounted on the digital camera 100.

The lens unit 150 is a unit equipped with a photographing lens group, and is detachably configured to the digital camera 100. A lens 103 is usually composed of a plurality of lenses, but only one lens is shown for simplicity in FIG. 2. A communication terminal 6 is an electrical contact that allows the lens unit 150 to communicate with the digital camera 100. A lens control circuit 4 of the lens unit 150 can communicate with a system control unit 50 described below when the communication terminal 6 and the communication terminal 10 of the digital camera 100 are in physical contact. The lens control circuit 4 controls operation of each block that the lens unit 150 has. More specifically, the lens control circuit 4 controls, based on a control signal from the digital camera 100, opening and closing of the aperture 1 via an aperture drive circuit 2 and displacement of the lens 103 for the focus state change via an AF drive circuit 3.

On the other hand, operation of each block of the digital camera 100 is controlled by the system control unit 50. The system control unit 50 is a control unit comprising at least one processor or circuit. The system control unit 50 reads out an operation program for each block included in the digital camera 100 from a non-volatile memory 56, deploys the program to a system memory 52, and executes the program, thereby controlling the operation of the digital camera 100.

The non-volatile memory 56 is a recording device configured to be electrically erasable and recordable, such as Flash-ROM. The non-volatile memory 56 stores, in addition to the operation program of each block included in the digital camera 100, constants for the operation of each block. In contrast, the system memory 52 is a recording device such as a RAM, for example, and is used as a deployment region for the operation program of each block.

A shutter 101 is a focal plane shutter, and its open/close time is controlled according to an exposure time set by the system control unit 50. An image capturing unit 22 is an image sensor, such as a CCD or CMOS sensor, and outputs an analog image signal by converting an optical image formed on the imaging surface by the lens unit 150 into an electrical signal. An A/D converter 23 converts the analog image signal output by the image capturing unit 22 into a digital image signal (image data). In this embodiment, the image capturing unit 22 is described as a single-plane color image sensor equipped with a general primary color filter. Here, the primary color filter is composed of three types of color filters having primary transmission wavelengths near 650 nm, 550 nm, and 450 nm, respectively, arranged in a mosaic pattern. By applying the primary color filter, each pixel of the single-plane color image sensor captures a color plane corresponding to one of the R (red), G (green), or B (blue) bands. In other words, photoelectric conversion elements that constitute the single-plane color image sensor can only obtain a light intensity for each single color plane.

An image processing unit 24 performs various image processing such as pixel interpolation, resizing, and color conversion on the image data output by the A/D converter 23 or the image data read by a memory control unit 15 to be described later. Details will be described later. The image processing unit 24 also performs arithmetic processing on the image data obtained by image capturing to derive information for exposure control and ranging control. In the digital camera 100 of this embodiment, AF (auto focus) processing, AE (auto exposure) processing, EF (flash preliminary emission) processing of TTL (through the lens) method are performed based on this information. The image processing unit 24 also performs AWB (auto white balance) processing of TTL method by performing calculations on the image data obtained through image capturing.

The memory control unit 15 controls the writing and reading of data for a memory 32, which may be a volatile recording device, for example. The memory 32 is used as a storage area for storing the intermediate data output by the operation of each block of the digital camera 100. For example, image data output from the A/D converter 23 in response to image capturing is stored in the memory 32 by the memory control unit 15. Therefore, the memory 32 has a sufficient storage capacity to store a predetermined number of still images and a predetermined time of moving images and audio data. The memory 32 is also used as a work area for various types of image processing in the image processing unit 24.

The memory 32 also serves as a video memory for image display. In the digital camera 100 of this embodiment, the display unit 28 and the EVF 29 are provided as display devices, and the image data to be displayed on these (display image) is configured in the memory 32. In more detail, for example, when the digital camera 100 is set to the photographing mode, the image data for display (display image) generated by the image processing unit 24 is configured in the memory 32. The configured display image is converted into an analog image signal by the D/A converter 19, and outputs to the display unit 28 or the EVF 29. The display unit 28 and the EVF 29 may be, for example, LCD or OLED, and realize the display according to the input image signal. Here, in the photographing mode, the image data obtained by image capturing is sequentially transmitted to the display unit 28 or the EVF 29 by applying the predetermined conversion processing by the image processing unit 24, thereby realizing the live view display in the digital camera 100. Hereinafter, an image displayed on the display unit 28 or the EVF 29 in the live view will be referred to as a live view image.

A setting display unit 43 displays various setting values pertaining to the exposure setting of the digital camera 100, such as shutter speed and aperture value, for example. The display of the setting display 43 is controlled by the setting display drive circuit 44 under the control of the system control unit 50. The system timer 53 realizes the timekeeping function to measure and manage the time or the time of an internal clock, which is used to control the operation of each block in the digital camera 100.

An operation unit 70 is a user interface provided by the digital camera 100 of this embodiment to accept various operation inputs. When the operation unit 70 detects that an operation input has been made for each user interface, it outputs the corresponding control signal to the system control unit 50. In the example of FIG. 2, the operation unit 70 is shown as including a mode switch 60, a shutter button 61, and a power switch 72. However, the operation unit 70 may include the main electronic dial 71, the sub-electronic dial 73, the cross key 74, the SET button 75, the moving image button 76, the AE lock button 77, the enlargement button 78, the playback button 79, and the menu button 81.

A mode switch 60 is an operation member that accepts operation input pertaining to instructions for switching an operation mode of the digital camera 100. The digital camera 100 of this embodiment includes, as the operation mode, at least a still image photographing mode, a moving image photographing mode, and a playback mode, and one of the modes is designated by the mode switch 60. The still image photographing mode may further include an auto shooting mode, an auto scene determination mode, a manual mode, an aperture priority mode (Av mode), a shutter speed priority mode (Tv mode), and a program AE mode (P mode). In addition, various scene modes, custom modes, etc., which are photographing settings for different photographing scenes, may also be included. In this embodiment, the operation mode of the digital camera 100 is described as being directly switchable by the mode switch 60, but it may also be configured to be switchable using other operation members. Similarly, a plurality of modes may be included in the moving image photographing mode.

The shutter button 61 is configured to include a first shutter switch 62 and a second shutter switch 64. The shutter button 61 is configured to allow two-step pressing operation input, with the first shutter switch 62 turned ON (photographing preparation instruction) when half-pressed and the second shutter switch 64 turned ON (photographing instruction) when fully pressed. Upon detecting that the first shutter switch 62 is made ON, the operation unit 70 outputs a corresponding control signal (first shutter switch signal SW1) to the system control unit 50. Based on the SW1, the system control unit 50 controls the operation of each block to start photographing preparation operations such as AF (auto focus) processing, AE (auto exposure) processing, AWB (auto white balance) processing, and EF (flash preliminarily emission) processing. Upon detecting that the second shutter switch 64 is made ON, the operation unit 70 outputs a corresponding control signal (second shutter switch signal SW2) to the system control unit 50. Based on the SW2, the system control unit 50 controls the operation of each block to start the operation for a series of photographing processes (signal readout by the image capturing unit 22, conversion to image data, image processing for recording, and storage as an image file).

The operation unit 70 also detects a touch operation made on the touch panel 70a that is integrally configured with the display unit 28. When the touch operation is made, the operation unit 70 outputs information of coordinates in which the touch operation is performed. Here, the touch panel 70a may be made of a material with a transmittance that does not interfere with the display of the display unit 28, for example, and may be attached to an upper layer of the display surface of the display unit 28. The coordinates for detecting the touch operation may be managed in association with the coordinates in the display area of the display unit 28, and in this case, it is possible to easily grasp which object arranged in the display image is the touch operation for.

The power supply control unit 80 consists of a battery detection circuit, a DC-DC converter, a switch circuit to switch the block to be energized, etc., and detects whether a battery is installed, the type of battery, and the remaining battery capacity. The power supply control unit 80 controls the DC-DC converter based on the detection result and an instruction from the system control unit 50, and supplies a required voltage to each unit including the recording medium 200 for a required period. The power supply unit 30 is a source of power, such as primary batteries such as alkaline and lithium batteries, secondary batteries such as NiCd, NiMH, and lithium-ion batteries, and AC adapters.

The recording medium 200 is a recording device for recording image data obtained by photographing, such as a memory card (semiconductor memory) or a hard disk (magnetic disk), for example. The recording medium I/F 18 is an interface that enables data exchange between the recording medium 200 and the digital camera 100, and controls writing of data to the recording medium 200 and reading of data from the recording medium 200.

A communication unit 54 is a communication interface with external devices provided by the digital camera 100. The communication unit 54 connects to an external device by radio or wired, and transmits and receives video and audio signals. The communication unit 54 may be connected to the external device indirectly via a wireless LAN (Local Area Network) or the Internet. Alternatively, the communication unit 54 may be directly connected to an external device, such as Bluetooth® or Bluetooth Low Energy. The digital camera 100 of this embodiment is configured so that images captured by the image capturing unit 22 (including live view images) and images recorded on the recording medium 200 can be transmitted to the external device via the communication unit 54.

The orientation detection unit 55 includes, for example, an acceleration sensor or a gyro sensor, and detects the orientation of the digital camera 100 with respect to the gravity direction. The orientation information detected by the orientation detection unit 55 is recorded in association with the image data recorded in connection with the photographing, and is used to determine whether the image data was photographed when the digital camera 100 was in the horizontal or vertical position. Alternatively, instead of associating the orientation information with the image data, the image data may be recorded as rotated based on the orientation. In addition, the orientation detection unit 55 may detect the movement of the digital camera 100, for example, panning, tilting, lifting, and whether it is stationary or not.

The eye-close detection unit 57 is a sensor that detects approach (eye-close) and separation (eye-away) of a human eye (object) 161 from the eyepiece 16 of the viewfinder. In the digital camera 100 of this embodiment, the system control unit 50 switches the state of the display unit 28 and the EVF 29 to either display or non-display according to the state detected by the eye-close detection unit 57. In more detail, the system control unit 50 sets a display destination to the display unit 28 and hides the EVF 29 during eye-away state, at least in the photographing standby state and when the display destination switching is set to automatic. In addition, the system control unit 50 sets the display destination to the EVF 29 and hides the display unit 28 during eye-close state. The eye-close detection unit 57 can be an infrared proximity sensor, for example, and detects the approach of an object to the eyepiece 16 of the viewfinder that incorporates the EVF 29. When an object approaches, the infrared rays emitted from the light emitting unit (not shown) of the eye-close detection unit 57 are reflected and received by the light receiving unit (not shown) of the infrared proximity sensor, and the object is detected. The eye-close detection unit 57 may also be capable of determining a distance (eye-close distance) at which the object is approaching from the eyepiece 16 according to the amount of infrared light received. In this way, the eye-close detection unit 57 performs eye-close detection, which detects the proximity distance of an object to the eyepiece 16, and detects that the EVF 29 is being viewed. The eye-close detection unit 57 shall determine that the state is eye-close when an object is detected to have approached the eyepiece 16 within a predetermined distance in the eye-away state (non-approaching state), and shall determine that the state is eye-away when the object that had been approaching is detected to have moved away from the eyepiece 16 by a predetermined distance or more in the eye-close state. A threshold value for detecting eye-close and a threshold value for detecting eye-away may be different by providing hysteresis, for example. When the eye-close detection unit 57 detects eye-close, it shall be recognized as being in the eye-close state until the eye-away is detected. When the eye-close detection unit 57 detects eye-away, it shall be recognized as being in the eye-away state until the next eye-close is detected. Note that the infrared proximity sensor is just one example, and other sensors may be used for the eye-close detection unit 57 as long as they can detect the approach of eyes or objects that can be considered eye-close.

<Development Processing>

Figure 3:
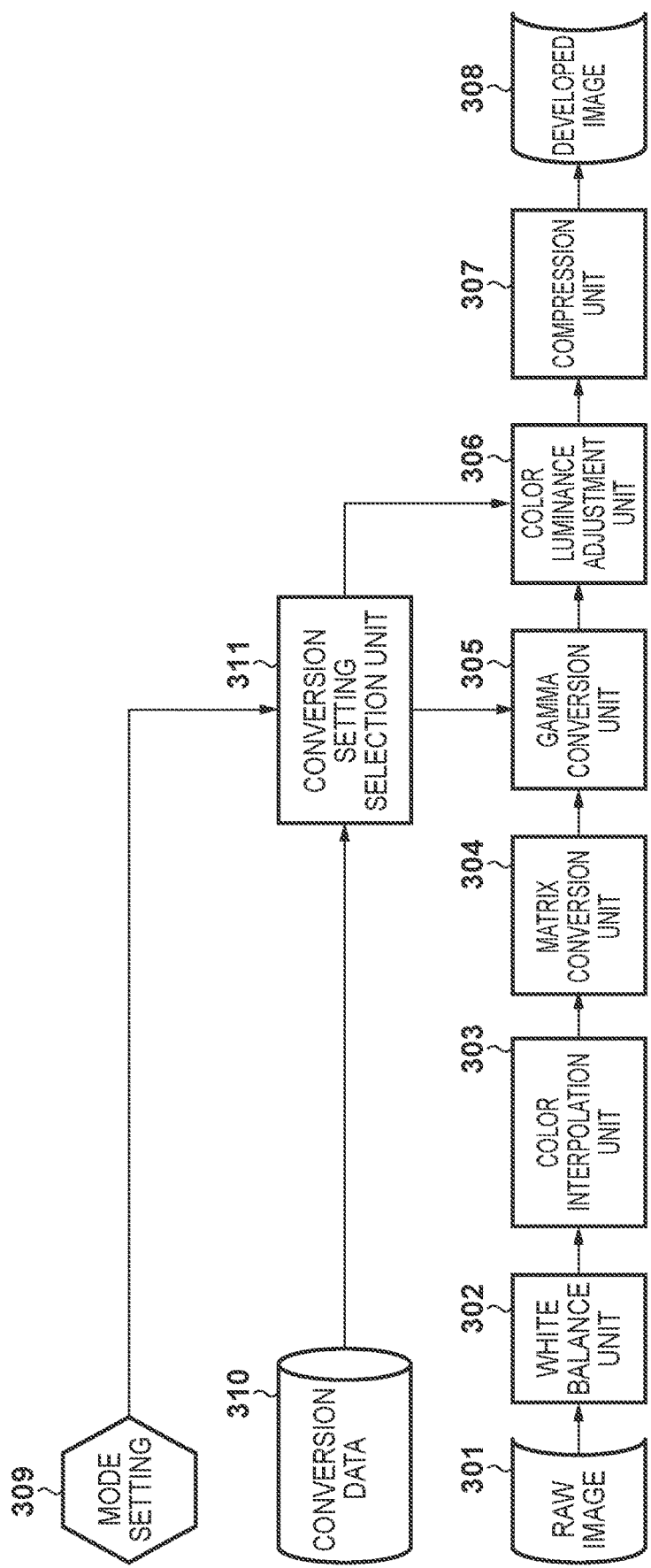
FIG. 3 is a block diagram exemplarily illustrating a functional configuration of an image processing unit 24 according to the embodiment of the disclosure.

Hereinafter, development processing performed by the image processing unit 24 in the digital camera 100 of this embodiment will be described with reference to FIG. 3. In FIG. 3, the processes performed by the image processing unit 24 in the development processing are illustrated by separating them as different blocks.

As described above, a primary color filter in which three types of color filters are arranged in a mosaic pattern is applied to the image capturing unit 22. For this reason, the image data (a RAW image 301) that the A/D converter 23 converts and outputs based on the image capturing by the image capturing unit 22 is a color mosaic image. The image processing unit 24 reads out the RAW image 301 from the memory 32, applies this development processing, and generates a developed image 308.

A white balance unit 302 performs white balance processing on the RAW image 301 to perform color conversion so that an image of a subject that is originally white is made white. More specifically, the white balance unit 302 plots the RGB data of each pixel constituting the RAW image 301 in a predetermined color space such as an XY color space. Then, the white balance unit 302 integrates R, G, B of the data plotted near a locus of a black body radiation which is likely to be a light source color on the color space, and derives the white balance coefficients (G/R and G/B) of the R and B components from the integrated values. The white balance unit 302 performs white balance processing using the obtained white balance coefficient.

A color interpolation unit 303 performs noise reduction processing and processing for interpolating pixel values of color components that are not included in each pixel on the image data converted by the white balance unit 302. This process produces a synchronized image with R, G, and B color information (pixel values of color components) for all pixels.

The synchronized image generated by the color interpolation unit 303 is converted into a color image, which is the basis of the process, by performing matrix conversion processing by a matrix conversion unit 304 and gamma conversion processing by a gamma conversion unit 305. Further, with respect to the color image, a color luminance adjustment unit 306 applies an adjustment process for adjusting the color and luminance, thereby generating a color image having the content as a developed image. Adjustment by the color luminance adjustment unit 306 includes corrections according to the captured scene, for example, saturation enhancement by detecting that it is a sunset scene.

The development process is completed when a compression unit 307 performs compression processing on the color image generated by the color luminance adjustment processing, and the developed image 308 is generated. When photographing is performed, the generated developed image 308 is recorded on the recording medium 200 after being written in the memory 32, and is displayed on the display unit 28 or the EVF 29.

Incidentally, as described above, in the digital camera 100 of this embodiment, the display unit 28 or the EVF 29 displays the live view image while being operated in the photographing mode, and expression of the live view image is configured to be switchable. Specifically, two types of display modes are provided for live view display: an "OVF-like" display mode and a "recording image quality" display mode, and the expression of the live view image differs depending on which display mode is used. These display modes are different from the operation modes of the digital camera 100, such as the photographing mode and the playback mode, and are modes for setting which live view image is to be displayed in the live view display.

In the image processing unit 24 of this embodiment, a conversion setting selection unit 311 supplies a conversion data 310 corresponding to a setting of the display mode (mode setting 309) to the gamma conversion unit 305 and the color luminance adjustment unit 306, whereby the expression of the live view image generated as the developed image is changed. That is, the live view images displayed in the two display modes are generated with different gamma conversion and color luminance adjustment processes in the development processing. The conversion data 310 may be recorded in, for example, the system memory 52, and may be supplied to the image processing unit 24 by the system control unit 50 for development processing.

For example, the display mode can be changed by selecting a display mode item on a menu screen shown in FIG. 4A, which is displayed in response to an operation input to the menu button 81, and then switching to the screen shown in FIG. 4B. The screen of the FIG. 4B is configured to be able to accept operation input for selecting which display mode is to be set to the OVF-like display mode or the recording image quality display mode.

Here, the OVF-like display mode is a mode in which a live view image reproducing the colors of a real subject is displayed on the display unit 28 or the EVF 29 in order to provide the same immersive feeling as when the subject is checked by the OVF. That is, the image displayed as the live view image in the OVF-like display mode is different from, for example, a vivid and high-contrast image recorded by photographing, and reproduces the color and luminance of the real subject as captured through the photographer's eyes. In other words, when the OVF-like display mode is used, a conversion characteristic that is highly reproducible for the photographed scene is supplied to the image processing unit 24 as conversion data 310 in accordance with the actual scenery of the photographed scene, rather than a conversion characteristic as defined in the standard.

On the other hand, the recording image quality display mode is a mode in which a live-view image having the same expression as the image data that is to be recorded on the recording medium 200 as an image file when photographing is performed is displayed on the display unit 28 or the EVF 29. In the digital camera 100 of this embodiment, by selecting a recording image quality item in the menu screen of FIG. 4A and transitioning to the screen of FIG. 4C, it is possible to accept changes to a tone expression in the image data recorded when photographing is performed. It is assumed that two types of recording image quality are provided, for example, SDR (Standard Dynamic Range) and HDR (High Dynamic Range). Therefore, in the recording image quality display mode and when the recording image quality is SDR, information on a tone characteristic and tone resolution specified in BT.601 recommended by the International Telecommunication Union Radio Communication Division (ITU-R) is supplied to the image processing unit 24 as the conversion data 310. Therefore, in the recording image quality display mode and when the recording image quality is HDR, information on a tone characteristic and tone resolution specified in ITU-R recommendation BT.2100 is supplied to the image processing unit 24 as the conversion data 310. In any case, in the recording image quality display mode, the live view image displayed on the display unit 28 and the EVF 29 is subjected to the same development processing as the image data to be recorded on the recording medium 200 when the main shooting is performed.

<Tone Conversion Characteristic for Each Mode>

Figure 5A:
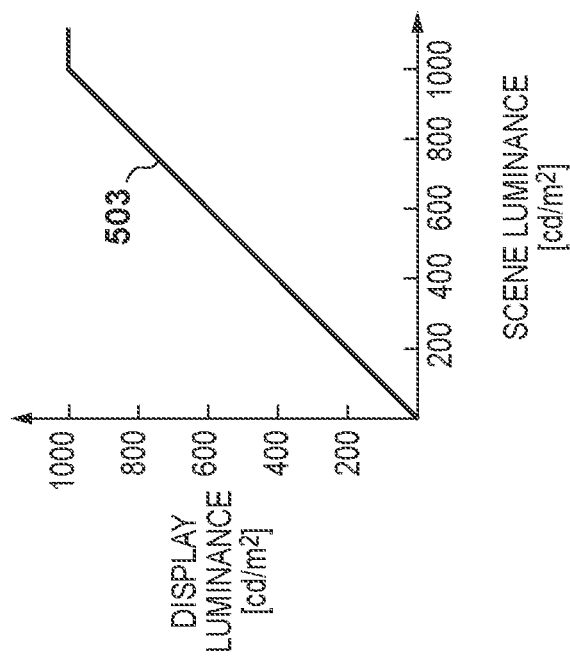
FIGS. 5A and 5B are diagrams exemplarily illustrating a tone conversion characteristic for each mode of a live view display according to the embodiment of the disclosure.
Figure 5B:
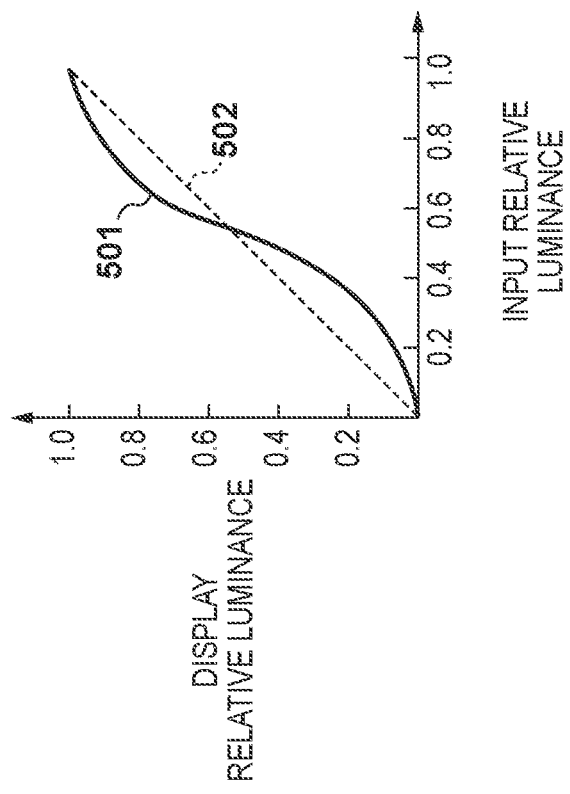

Here, the tone conversion performed during the live view image generation according to the display mode in the development processing will be described in detail with reference to examples of FIGS. 5A and 5B. FIGS. 5A and 5B illustrate the Opto-Optical Transfer Function (OOTF) for the overall conversion characteristic of a system in which light incident through the lens unit 150 is displayed as light in display devices such as the display unit 28 and the EVF 29.

The OOTF in the recording image quality display mode is, for example, as shown in FIG. 5A. In the example FIG. 5A, so as to easily grasp the tone conversion to be performed, the value X (input relative luminance) normalized for incident luminance with the maximum value of the input dynamic range as 1 is used as the horizontal axis, and the value Y (display relative luminance) normalized for display luminance of the display device with the maximum display luminance as 1 is used as the vertical axis. Here, the expression "relative" is used because the input dynamic range at the time of image capturing can vary depending on exposure setting such as aperture setting value, exposure time, and ISO sensitivity value.

As illustrated, OOTF 501 in the recording image quality display mode suppresses the display luminance to a lower value in the low luminance region and raises the display luminance to a higher value in the high luminance region as compared with a linear transformation characteristic 502 (Y=X) shown by a broken line. As a consequence, according to such a non-linear OOTF 501, a developed image (live view image) with tighter blacks and higher contrast is output. In addition, as mentioned above, since memory color is emphasized for expression in the image data that is captured and recorded, the color luminance adjustment unit 306 performs image correction according to the scene detection results, for example, emphasizing saturation in a sunset scene.

On the other hand, the OOTF in the OVF-like display mode is as shown in FIG. 5B, for example. In the OVF-like display mode, the luminance of the scene captured by the photographer through own eyes is also reproduced in the live-view display mode, so in FIG. 5B, the horizontal and vertical axes are both aligned to luminance [cd/m$^2$], instead of the input dynamic range. That is, signal intensity appearing in the analog image signal output by the image capturing unit 22 indicates the relative luminance of the subject mapped to the input dynamic range corresponding to the exposure setting at the time of image capturing, and thus can differ from the actual (absolute) luminance of the subject. Also not limited to the exposure setting, the signal intensity appearing in the analog image signal may vary depending on a characteristic of the lens unit 150 used.

As shown in FIG. 5B, the OOTF in the OVF-like display mode uniquely maps the display luminance to the (apparent) luminance of the subject (hereinafter referred to as scene luminance) regardless of the exposure setting. That is, in the OVF-like display mode, even if the photographer changes the exposure setting, brightness of the displayed live view does not change as long as brightness of the real subject is the same. Further, in the example of FIG. 5B, the scene luminance and the display luminance has a linear relationship. In this way, it is possible to express tones that are closer to the photographer's appearance. If the input-output characteristic is as shown in FIG. 5B, the scene luminance will appear on the display device as it is, or as a display luminance substantially matched. In the example of FIG. 5B, the OOTF 511 is illustrated when a display device having a displayable luminance range of 0 to 1000 [cd/m$^2$] is employed. As shown in the figure, the OOTF 511 shows a linear transformation characteristic for the scene luminance up to 1000 [cd/m$^2$] which can be displayed on the display device, so that the scene luminance is displayed as it is. On the other hand, the scene luminance exceeding 1000 [cd/m$^2$] shows a characteristic of saturating at the maximum display luminance. In order to display a live view image that reproduces actual scenery, the conversion data 310 supplied to the mode setting 309 is configured to emphasize color reproducibility of the actual scenery and not to perform image correction such as saturation enhancement.

In this embodiment, it is assumed that processing is realized by a circuit or a processor corresponding to each block included in the digital camera 100 as hardware. However, the implementation of the disclosure is not limited thereto, and the processing of each block may be realized by a program that performs processing similar to the block. In addition, the various processes described in this specification may be executed by a single piece of hardware, shared among multiple pieces of hardware, or realized by both hardware and software.

<Live View Processing>

Figure 6:
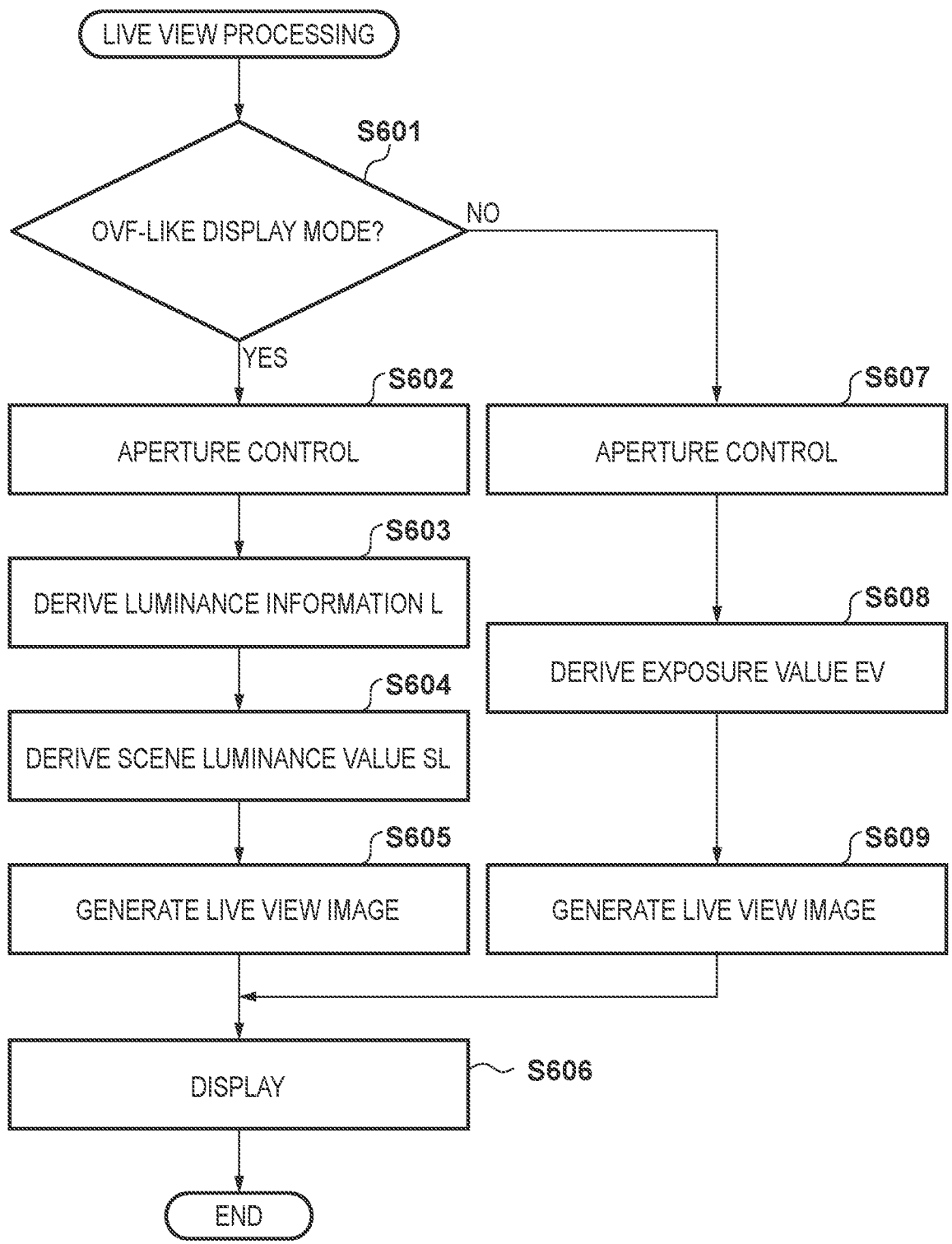
FIG. 6 is a flowchart exemplarily illustrating live view processing executed by the digital camera 100 according to the embodiment of the disclosure.

Next, regarding live view processing performed on the digital camera 100 of this embodiment having this kind of configuration, description is given in detail for the processing with reference to the flowchart of FIG. 6. The processing corresponding to the flowchart can be realized by, for example, the system control unit 50 reading out a corresponding processing program stored in the system memory 52, deploying it in the non-volatile memory 56, and executing it. The live view process is started, for example, when the digital camera 100 is activated and the operation mode is set to the photographing mode, and is repeatedly executed until the operation in the photographing mode is completed.

In step S601, the system control unit 50 determines whether or not the display mode relating to the live view display is set to the OVF-like display mode. The determination of this step may be performed by referring to the display mode information stored in the non-volatile memory 56, for example. The system control unit 50 advances the processing to step S602 when it is determined that the display mode relating to the live view display is the OVF-like display mode, and advances the processing to step S607 when it is determined that the live view display is not the OVF-like display mode, that is, the recording image quality display mode.

In step S602, the system control unit 50 controls the lens unit 150 so as to make the aperture 1 full-open state. The control is achieved by the system control unit 50 transmitting a control command to the lens control circuit 4 to make the aperture the full-open state, and the lens control circuit 4 giving a drive command to the aperture drive circuit 2 in response to the receipt of the information. The system control unit 50 also receives information on a maximum aperture value (Ao) of the aperture 1 from the lens control circuit 4 as a result of the aperture 1 being set to the full-open state. In the digital camera 100 of this embodiment, in order to display live-view images that have resolution closer to the resolution of human vision, the input dynamic range of the low luminance portion of the image capturing unit 22 is sufficiently secured by making the aperture the full-open state in the OVF-like display mode.

In step S603, the system control unit 50 derives luminance information L per unit time for each pixel based on the image data (the synchronized image generated by the color interpolation unit 303) obtained by image capturing in the full-open aperture state. For example, the luminance information L per unit time may be derived as follows.

$$L=(a \cdot R+b \cdot G+c \cdot B)/T$$

Here, R, G and B are the pixel values of each color component the pixel has, T is the exposure time used to obtain the image data, a, b and c are the luminance conversion coefficient of each pixel.

In step S604, the system control unit 50 derives a scene luminance value SL according to the scene luminance for each pixel of the image data on the basis of the luminance information L derived in step S603. The scene luminance value SL may be derived by taking into account the full-open aperture value Ao of the lens unit 150, for example, as follows.

$$SL=K \cdot Ao^2 \cdot L$$

Here, K is a calibration coefficient, and may be a value derived for each aperture value based on preliminary actual measurement, for example.

In the case where an interchangeable lens unit 150 is used as the imaging optical system, as in the digital camera 100 of this embodiment, the full-open aperture value Ao differs for each lens unit 150 to be mounted, and an amount of light reduction by the lens unit 150 during image capturing can vary. Therefore, by multiplying the luminance information L a value corresponding to the full-open aperture value Ao, the scene luminance is derived by correcting for the light reduction caused by the lens unit 150.

In step S605, the system control unit 50 supplies the derived scene luminance value SL and the converted data 310 for the OVF-like display mode to the image processing unit 24 to generate a live view image (display image). More specifically, in the image processing unit 24, the gamma conversion unit 305 performs luminance conversion of the synchronized image with the conversion characteristic as shown in FIG. 5B. Further, the color luminance adjustment unit 306 applies the color luminance adjustment processing that does not impair the reproducibility of color and luminance to the image after the luminance conversion, and the compression unit 307 compresses the resulting image to generate the live view image.

Note, the converted data 310 provided to the image processing unit 24 in this step may include information on a brightness (display luminance) setting and a display characteristic of the display unit 28 or the EVF 29 used for displaying the live view image. That is, in the OVF-like display mode, the live view image is generated in consideration of the brightness setting and the display characteristic so that the color luminance displaying is the same as that of the actual scenery, regardless of the display luminance setting of the display unit 28 made by the user. In other words, the live view image generated in relation to the OVF-like display mode is configured to show the same color luminance as the actual scenery when displayed on the display unit 28 or the EVF 29, regardless of the display characteristic or the display setting as well as the exposure setting.

In step S606, the system control unit 50 controls to display the live view image generated by the image processing unit 24 on the display device (the display unit 28 or the EVF 29) that realizes live view display.

On the other hand, if it is determined in step S601 that the recording image quality display mode is selected, the system control unit 50 controls the lens unit 150 in step S607 so that the aperture setting value according to the result of automatic aperture calculation by AE or the aperture setting value set by manual operation is set. In other words, the aperture open/close control performed in the recording image quality display mode is the same control as when photographing the image data to be recorded, and realizes image capturing that can simulate the exposure and a depth of field for the recording.

In step S608, the system control unit 50 derives an exposure value (EV) of the subject based on the image data obtained by image capturing using the currently set exposure setting and various information of the exposure setting. Here, the exposure setting refers to the setting of the digital camera 100 and the lens unit 150 when the photographing (main shooting) for the image data to be recorded on the recording medium 200 is performed, triggered by the operation input to the second shutter switch 64. Therefore, various information of the exposure setting includes information of the aperture setting value, the exposure time, and the ISO sensitivity value.

In step S609, the system control unit 50 supplies the derived exposure value and the converted data 310 for the recording image quality display mode to the image processing unit 24 to generate a live view image (display image). More specifically, in the image processing unit 24, the gamma conversion unit 305 performs luminance conversion of the synchronized image with the conversion characteristic as shown in FIG. 5A. Further, the color luminance adjustment unit 306 applies the color luminance adjustment processing according to the memory color to the image after the luminance conversion, and the compression unit 307 compresses the resulting image to generate the live view image. The live view image generated for the recording image quality display mode can be displayed at a luminance setting desired by the user, which is set for the display unit 28, and there is no need to make corrections that take into account the display luminance setting or the display characteristic when generating the live view image. Note, the converted data 310 provided to the image processing unit 24 in this step may or may not include information on a brightness (display luminance) setting and a display characteristic of the display unit 28 or the EVF 29 used for displaying the live view image.

In this way, the live view processing allows the user to switch between displaying a live view image according to the exposure setting for recording, which is suitable for exposure simulation before photographing, and displaying a live view image with high reproducibility, as if the user were viewing a cutout of the actual scenery. Although, in the image capturing apparatus equipped with a conventional OVF, the brightness of the scene to be viewed through the viewfinder varies depending on the brightness of the lens unit 150 to which it is attached, but the OVF-like display mode of this method, it is possible to display a live view image independent of this.

For example, when the digital camera 100 is set to the OVF-like display mode, the flow of display processing of the display unit 28 according to before and after photographing for recording the image data, as in the timing chart in FIG. 7. In the example of FIG. 7, when the operation input of the shutter button 61 according to photographing is made during the live view display (701) in the OVF-like display mode, the live view display is temporarily suspended during a period 702 in which the still image photographing processing is executed, and the image obtaining processing for photographing by the image capturing unit 22 is performed. Here, when obtaining an image for photographing, prior to this, change control to the exposure setting for photographing (change control of the aperture value, the exposure time and the ISO sensitivity value) is performed. Further, when the image capturing unit 22 completes the image obtaining processing according to photographing, the image for the live view display is able to be obtained, so the display of the display unit 28 will be live view display (703) again, after the period 702.

On the other hand, when various image processing for recording in the image processing unit 24 and recording on the recording medium 200 are completed for the image obtained in the period 702, the image is displayed as a quick review display (704) on the display unit 28 for a predetermined period of time. Since the image displayed as the quick review display (704) is an image (record image) that is actually recorded, the image has the same representation as the live view image displayed in the recording image quality display mode, even when the OVF-like display mode is set. In other words, during live view display, while a live view image which has a representation of the actual scenery cut out is displayed as in OVF, when photographing and recording are performed, an image to confirm an effect of the exposure setting is displayed as the quick review display (704), and therefore the benefits of EVF are not impaired.

As described above, the image processing apparatus of this embodiment can provides a simulation function for images recorded by photographing, while ensuring a presentation function of the same immersive feeling as in the case of using OVF. In other words, the image processing apparatus according to the aspect of the embodiments is configured to be capable of generating the following two types of live view images (display images) by converting the captured images obtained by image capturing. One type of display image is an image generated by converting the luminance of a scene appearing in the captured image into an output luminance that is uniquely determined according to the derived actual luminance of the scene. On the other hand, another type of display image is an image generated by converting the luminance of the scene appearing in the captured image into an output luminance corresponding to the set exposure value. These two types of display images differ in that the output luminance of the latter varies according to exposure setting such as the aperture state, the exposure time, the ISO sensitivity, etc., while the former shows a constant output luminance regardless of these exposure setting. They also differ in that the latter shows different appearances when displayed on display device depending on the display luminance setting and display characteristic of the display device, while the former shows a constant appearance regardless of these factors.

Note, this embodiment is explained as providing, in order to output a live view image that does not depend on the display luminance setting or display characteristic of the display unit 28, the conversion data 310 that disables these setting to the image processing unit 24 in the OVF-like display mode of this embodiment, but the implementation of the disclosure is not limited to this. That is, as described above, the disclosure is sufficient to generate display images with the output luminance that is uniquely determined according to the derived actual luminance of the scene in the OVF-like display mode, and conversion considering the display luminance setting may be realized by other configurations.

In this embodiment, it is explained that the scene luminance is derived based on the image data obtained by setting the aperture 1 in the full-open state in the OVF-like display mode, but the implementation of the disclosure is not limited to this. In other words, the higher the resolution of the luminance representation in the image data obtained by image capturing, the more detailed reproduction of the actual scenery the live view image displayed in the OVF-like display mode can be, but the live view image need not necessarily be fine. Therefore, the derivation of the scene luminance and the generation of the live view image for the OVF-like display mode may be based on the image data captured at an aperture state different from the full-open state. In particular, for scenes in which high luminance components dominate in the image data obtained by image capturing, it is better to set the aperture 1 to closed state to ensure a suitable input dynamic range, and therefore it will be understood that the disclosure is not limited by the aperture state in the OVF-like display mode.

In addition, in this embodiment, it is explained that scene derivation is performed after absorbing the difference in the maximum aperture value according to the lens unit 150, but the influence on the scene luminance calculation by the lens unit 150 to be mounted is not limited thereto. For example, depending on the lens unit 150 to be mounted, the image data obtained by image capturing can be affected by vignetting and chromatic magnification aberration. Therefore, the derivation of the scene luminance in the OVF-like display mode may be performed after correcting the luminance reduction or image quality degradation due to these factors. Here, vignetting is a phenomenon in which the amount of light at the edges of an image decreases compared to the amount of light at the center of the image, caused by a portion of the ambient light being blocked by the lens barrel. Therefore, for example, correction data of vignetting according to the aperture value, the focal length, and the photographing distance of the lens unit 150 may be stored in advance in the non-volatile memory 56, and the image data may be corrected using the correction data to improve the accuracy of scene luminance derivation. Also magnification chromatic aberration is a phenomenon in which red, green and blue light passing through the lens is focused at different positions in a direction perpendicular to the optical axis for each of their wavelengths, causing the color around the image blur. Therefore, for example, aberration information of the lens unit 150 is similarly pre-stored to the non-volatile memory 56, and luminance data and color difference data of the subject may be corrected based on the aberration information to improve the accuracy of scene luminance derivation.

In addition, in this embodiment, it is explained that the generated live-view image may be displayed on either the display unit 28 or the EVF 29 and that this display switching is made according to the result of eye-close detection, but the implementation of the disclosure is not limited thereto. For example, since displaying a live view image having a white luminance saturating (overexposure) area on the EVF 29, which is viewed with the user's eye close to the eyepiece 16, can dazzle the eye, and therefore the OVF-like display mode may be set when the EVF 29 is used for displaying. In this case, the recording image quality display mode may be set when the display unit 28 is used for displaying, so that a recorded image quality can be easily confirmed when the eye is taken away from the viewfinder to look at the display unit 28, for example. In other words, display control may be performed to prevent the live view image generated in the recording image quality display mode from being displayed on the EVF 29 (the OVF-like display mode is forcibly set during the eye-close state is detected), thereby realizing a presentation that takes the user's eyes into consideration.

In this embodiment, switching the operation of the gamma conversion unit 305 and the color luminance adjustment unit 306 of the image processing unit 24 depending on the set mode is explained, but the implementation of the disclosure is not limited to this. For example, dedicated conversion hardware may be provided for each of the OVF-like display mode and the recorded image quality display mode, and which hardware to use may be switched according to the set mode. This makes it possible to shorten the time required for the processing for switching between the two modes.

In addition, in this embodiment, the derivation of the scene luminance is performed based on the image data obtained by image capturing, but the disclosure is not limited to this. That is, the actual luminance of the scene need not be performed based on the analysis of the captured image, but may be based on the sensor output from another photometric sensor mounted on the digital camera 100 or an external photometric sensor configured to communicate with the digital camera 100.

Further, in this embodiment, for the generation of the live view image for the OVF-like display mode, it is explained that the tone conversion characteristic that shows a linear transformation characteristic up to the maximum display luminance and saturates the scene luminance values that exceed the maximum display luminance is used, as illustrated in FIG. 5B. However, the implementation of the disclosure is not limited to this, and the conversion characteristic different from that of FIG. 5B may be adopted in accordance with the exposure setting from which the captured images from which the scene luminance was derived are obtained. For example, a non-linear tone conversion characteristic may be adopted. Further, for example, in an illuminance environment exceeding 100,000 lx, control may be performed to change the luminance value to be saturated or to make an intermediate characteristic different, taking into account that the user may have difficulty seeing the display of the display unit 28.

Also, in this embodiment, it is explained that when photographing is performed, an image of recording quality, that is, an image generated by the same image processing as the live view image in recording quality display mode, is displayed for quick review, but the implementation of the disclosure is not limited to this. An image generated by image processing similar to the OVF-like display mode may be used for quick review display.

In this embodiment, it is explained that the image processing unit 24 of the digital camera 100 having the image capturing unit generates two types of images, but the implementation of the disclosure is not limited to this. The aspect of the embodiments is applicable to any image processing apparatus that is configured to generate two types of images for display from an obtained captured image: a display image converted to an output luminance uniquely determined based on scene luminance, and a display image converted to an output luminance based on exposure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-044385, filed Mar. 13, 2020, which is hereby incorporated by reference herein in its entirety.

What is claimed is:

1. An apparatus for generating a display image to be displayed on a display device based on a captured image obtained by capturing a scene, comprising:
at least one processor; and
a memory storing a program that, when executed by the at least one processor, causes the at least one processor to function as:
a first obtaining unit configured to obtain the captured image;
a second obtaining unit configured to obtain exposure setting relating to the obtained captured image;
a third obtaining unit configured to obtain luminance of the scene;
a setting unit configured to set a mode for the generating the display image; and
a generation unit configured to generate the display image by performing luminance conversion of the obtained captured image depending on the mode set by the setting unit, wherein
in a case where a first mode is set, the generation unit performs the luminance conversion of the captured image using a first conversion characteristic indicating that output luminance after conversion is uniquely determined for the luminance of the scene, and that the output luminance does not change depending on the exposure setting, and in a case where a second mode is set, the generation unit performs the luminance conversion of the captured image using a second conversion characteristic indicating that the output luminance changes depending on the exposure setting.

2. The apparatus according to claim 1, wherein the program further causes the at least one processor to function as a fourth obtaining unit configured to obtain a display luminance setting and a display characteristic of the display device, the generation unit varies a conversion characteristic used for the luminance conversion of the captured image depending on the obtained display luminance setting and display characteristic, and the first conversion characteristic indicates that the output luminance is determined for the luminance of the scene when the display image is displayed on the display device.

3. The apparatus according to claim 1, wherein the generation unit generates the display image by further performing adjustment processing for adjusting color and luminance of the captured image which is luminance converted, and the adjustment processing performed in the first mode is different from the adjustment processing performed in the second mode.

4. The apparatus according to claim 1, wherein the program further causes the at least one processor to function as a deriving unit configured to derive the luminance of the scene based on the captured image, and the second obtaining unit obtains the derived luminance of the scene.

5. The apparatus according to claim 4, wherein the deriving unit derives the luminance of the scene based on an image obtained by correcting light reduction caused by an optical system at the time of capturing of the captured image.

6. The apparatus according to claim 1 further comprising: an image sensor outputs the captured image, wherein the program further causes the at least one processor to function as a display control unit configured to control display of the display image on the display device.

7. The apparatus according to claim 6, wherein the display device functions as an electronic viewfinder by displaying the display image.

8. The apparatus according to claim 6, wherein the program further causes the at least one processor to function as:

an operation input unit configured to accept a photographing instruction; and a recording unit configured to record a record image obtained by photographing based on the photographing instruction, wherein the generation unit generates the record image by luminance converting, using the second conversion characteristic, the captured image obtained in response to the photographing instruction.

9. The apparatus according to claim 8, wherein the display control unit switches the display of the display device from the display image to the record image when recording the record image.

10. The apparatus according to claim 6, wherein the display device includes a first display device and a second display device, the apparatus further comprises a sensor for detecting that the first display device is being viewed, in a case the first display device is being viewed, the display control unit controls to display the display image on the first display device, and in a case where the first display device is not being viewed, the display control unit controls to display the display image on the second display device.

11. The apparatus according to claim 10, wherein in a case where the first display device is being viewed, the setting unit sets the mode for generating the display image to the first mode, and in a case where the first display device is not being viewed, the setting unit sets the mode for generating the display image to the second mode.

12. The apparatus according to claim 6, wherein the display device includes a first display device that is viewed in an eye-close state and a second display device that is viewed in an eye-away state, and the display control unit controls not to display the display image generated using the second conversion characteristic on the first display device.

13. A method of an apparatus for generating a display image to be displayed on a display device based on a captured image obtained by capturing a scene, comprising:

first obtaining the captured image;

second obtaining exposure setting relating to the captured image obtained by the first obtaining;

third obtaining luminance of the scene;

setting a mode for the generating the display image; and wherein the generating the display image performs luminance conversion of the captured image obtained by the first obtaining depending on the mode set by the setting, wherein in a case where a first mode is set, the luminance conversion of the captured image is performed using a first conversion characteristic indicating that output luminance after conversion is uniquely determined for the luminance of the scene, and that the output luminance does not change depending on the exposure setting, and in a case where a second mode is set, the luminance conversion of the captured image is performed using a second conversion characteristic indicating that the output luminance changes depending on the exposure setting.

14. The method according to claim 13, further comprising fourth obtaining a display luminance setting and a display characteristic of the display device, wherein the generating varies a conversion characteristic used for the luminance conversion of the captured image depending on the obtained display luminance setting and display characteristic, and wherein the first conversion characteristic indicates that the output luminance is uniquely determined for the luminance of the scene when the display image is displayed on the display device.

15. The method according to claim 13, wherein the generating generates the display image by further performing adjustment processing for adjusting color and luminance of the captured image which is luminance converted, and the adjustment processing performed in the first mode is different from the adjustment processing performed in the second mode.

16. A method of a capturing apparatus having the apparatus according to claim 1 and a sensor outputs the captured image by capturing, comprising:

controlling display of the display image on the display device.

17. A non-transitory computer-readable storage medium storing a program for causing a computer to perform method of an apparatus for generating a display image to be displayed on a display device based on a captured image obtained by capturing a scene, the method comprising:

first obtaining the captured image;

second obtaining exposure setting relating to the captured image obtained by the first obtaining;

third obtaining luminance of the scene;

setting a mode for the generating the display image; and wherein the generating the display image performs luminance conversion of the captured image obtained by the first obtaining depending on the mode set by the setting, wherein in a case where a first mode is set, the luminance conversion of the captured image is performed using a first conversion characteristic indicating that output luminance after conversion is uniquely determined for the luminance of the scene, and that the output luminance does not change depending on the exposure setting, and in a case where a second mode is set, the luminance conversion of the captured image is performed using a second conversion characteristic indicating that the output luminance changes depending on the exposure setting.

18. The non-transitory computer-readable storage medium according to claim 17, wherein the method further comprises fourth obtaining a display luminance setting and a display characteristic of the display device, wherein the generating varies a conversion characteristic used for the luminance conversion of the captured image depending on the obtained display luminance setting and display characteristic, and wherein the first conversion characteristic indicates that the output luminance is uniquely determined for the luminance of the scene when the display image is displayed on the display device.

19. The non-transitory computer-readable storage medium according to claim 17, wherein the generating generates the display image by further performing adjustment processing for adjusting color and luminance of the captured image which is luminance converted, and the adjustment processing performed in the first mode is different from the adjustment processing performed in the second mode.

* * * * *